US012679667B2

(12) United States Patent
Hoskins

(10) Patent No.: US 12,679,667 B2
(45) Date of Patent: Jul. 14, 2026

(54) PALLET STOP

(71) Applicant: DENSO International America, Inc., Southfield, MI (US)

(72) Inventor: Christopher Hoskins, New Market, TN (US)

(73) Assignee: DENSO International America, Inc., Southfield, MI (US)

( * ) Notice: Subject to any disclaimer, the term of this patent is extended or adjusted under 35 U.S.C. 154(b) by 68 days.

(21) Appl. No.: 18/947,031

(22) Filed: Nov. 14, 2024

(65) Prior Publication Data

US 2025/0304382 A1     Oct. 2, 2025

Related U.S. Application Data

(60) Provisional application No. 63/571,497, filed on Mar. 29, 2024.

(51) Int. Cl.
*B65G 47/88*          (2006.01)
*B65G 13/00*          (2006.01)

(52) U.S. Cl.
CPC ..... *B65G 47/8823* (2013.01); *B65G 47/8815* (2013.01); *B65G 13/00* (2013.01)

(58) Field of Classification Search
CPC . B65G 47/8815; B65G 47/8823; B65G 13/00
USPC .......................... 198/345.3, 343.1; 193/35 A
See application file for complete search history.

(56) References Cited

U.S. PATENT DOCUMENTS

| | | | | |
|---|---|---|---|---|
| 3,610,372 | A * | 10/1971 | Warren | B61K 7/02 |
| | | | | 188/62 |
| 3,675,801 | A * | 7/1972 | Larson | B65G 47/8815 |
| | | | | 414/416.03 |
| 4,068,751 | A * | 1/1978 | Azzi | B65G 1/00 |
| | | | | 193/35 A |
| 4,744,451 | A * | 5/1988 | Sekiguchi | B65G 47/8815 |
| | | | | 193/40 |
| 6,234,292 | B1 * | 5/2001 | Schut | B65G 47/8823 |
| | | | | 198/463.6 |
| 7,596,926 | B2 | 10/2009 | Schulte et al. | |
| 10,399,788 | B2 | 9/2019 | Suzuki | |
| 10,494,188 | B2 | 12/2019 | Zembutsu | |
| 2007/0256908 | A1 * | 11/2007 | Yazaki | B65G 13/075 |
| | | | | 193/35 A |
| 2018/0265305 | A1 * | 9/2018 | Loizeau | B65G 47/29 |

FOREIGN PATENT DOCUMENTS

| | | | | | |
|---|---|---|---|---|---|
| CH | | 692699 | A5 * | 9/2002 | B65G 47/8823 |
| JP | | 57077111 | A * | 5/1982 | B65G 47/8823 |

* cited by examiner

*Primary Examiner* — James R Bidwell
(74) *Attorney, Agent, or Firm* — Dickinson Wright PLLC

(57)          ABSTRACT

An apparatus for controlling movement of an object on a conveyor include a main body located beneath the conveyor and having a first end and a second end. A handle is connected to the second end of the main body. A stopper extends from the first end of the main body, wherein the stopper includes a thickness that is less than a width of a gap between two adjacent rollers of the conveyor. The apparatus is configured to be rotated around a longitudinal axis of the main body between a first position and a second position. In the first position the handle prevents the object from moving on the conveyor and in the second position the stopper prevents the object from moving on the conveyor.

20 Claims, 4 Drawing Sheets

PALLET STOP

CROSS-REFERENCE TO RELATED APPLICATION

The present disclosure claims the benefit of Provisional Patent Application No. 63/571,497 Filed Mar. 29, 2024 and entitled "P&D FLOW RAIL IMPROVEMENT", the contents of which are incorporated by reference in its entirety.

TECHNICAL FIELD

The present disclosure relates to an apparatuses and methods for controlling the conveyance of objects. More particularly, in embodiments, the present disclosure relates to apparatuses and methods for controlling the movement of pallets on a conveyor.

BACKGROUND

Traditional conveyors or flow rails include a removable stop at an end of the conveyor to prevent pallets containing finished goods from falling off of the conveyor. Workers remove these stops to unload the pallets from the conveyor. However, the workers may forget to reinsert the stop, causing other pallets containing finished goods to fall off of the conveyor, wherein the finished goods must then be cleared from the floor and scrapped. In addition, the finished goods may fall and injure the worker(s) or a passersby.

SUMMARY

Some aspects of the present disclosure are directed to an apparatus and method for controlling movement of a pallet on a conveyor. In an embodiment, an apparatus for controlling movement of a pallet on a conveyor having a plurality of rollers includes a main body configured to be mounted to the conveyor such that a first end of the main body is between a rear end and a front end of the conveyor, and a second end of the main body is adjacent the front end of the conveyor. A handle is connected to the second end of the main body and a stopper is connected to the first end of the main body. The apparatus is configured to be rotated between a first position and a second position. In the first position the handle is located higher than the plurality of rollers and prevents the pallet from moving past the front end of the conveyor, and the stopper is beneath the conveyor and aligned between at least two of the plurality of rollers. In the second position the stopper is located higher than the plurality of rollers and prevents the pallet from moving to the front end of the conveyor, and the handle is lower than when in the first position such that the handle does not block the pallet from moving past the front end of the conveyor.

In an embodiment, an apparatus for controlling movement of an object on a conveyor include a main body located beneath the conveyor and having a first end and a second end. A handle is connected to the second end of the main body. A stopper extends from the first end of the main body, wherein the stopper includes a thickness that is less than a width of a gap between two adjacent rollers of the conveyor. The apparatus is configured to be rotated around a longitudinal axis of the main body between a first position and a second position. In the first position the handle prevents the object from moving on the conveyor and in the second position the stopper prevents the object from moving on the conveyor.

In an embodiment, a method for controlling movement of an object on a conveyor include rotating a handle around a longitudinal axis of a main body between a first position to a second position, wherein the handle is connected to a first end main body and the main body is underneath the conveyor. In the first position the handle is positioned higher than the conveyor and the object is prevented from moving past an end of the conveyor and a stopper connected to a second end of the main body is positioned lower than the conveyor. In the second position the stopper is positioned higher than the conveyor and prevents the object from moving to the end of the conveyor. The stopper translates through a gap between two adjacent rollers of the conveyor when moving between the first position and the second position.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. It is to be understood that certain terms of direction or position, such as above, below, beneath, higher, lower, front, rear, or the like, are in relative reference to a conveyor and a use of the conveyor by a worker unloading a pallet from the conveyor, and are not intended to be limiting.

The following detailed description is merely exemplary in nature and is not intended to limit the invention or the application and uses of the invention. The apparatuses and methods are described herein with respect to the conveyance of pallets holding objects, totes, crates, finished goods, or the like. However, one of ordinary skill in the art will understand that the apparatuses and methods may also be used for controlling the transportation of any object on a conveyor.

Figure 1:
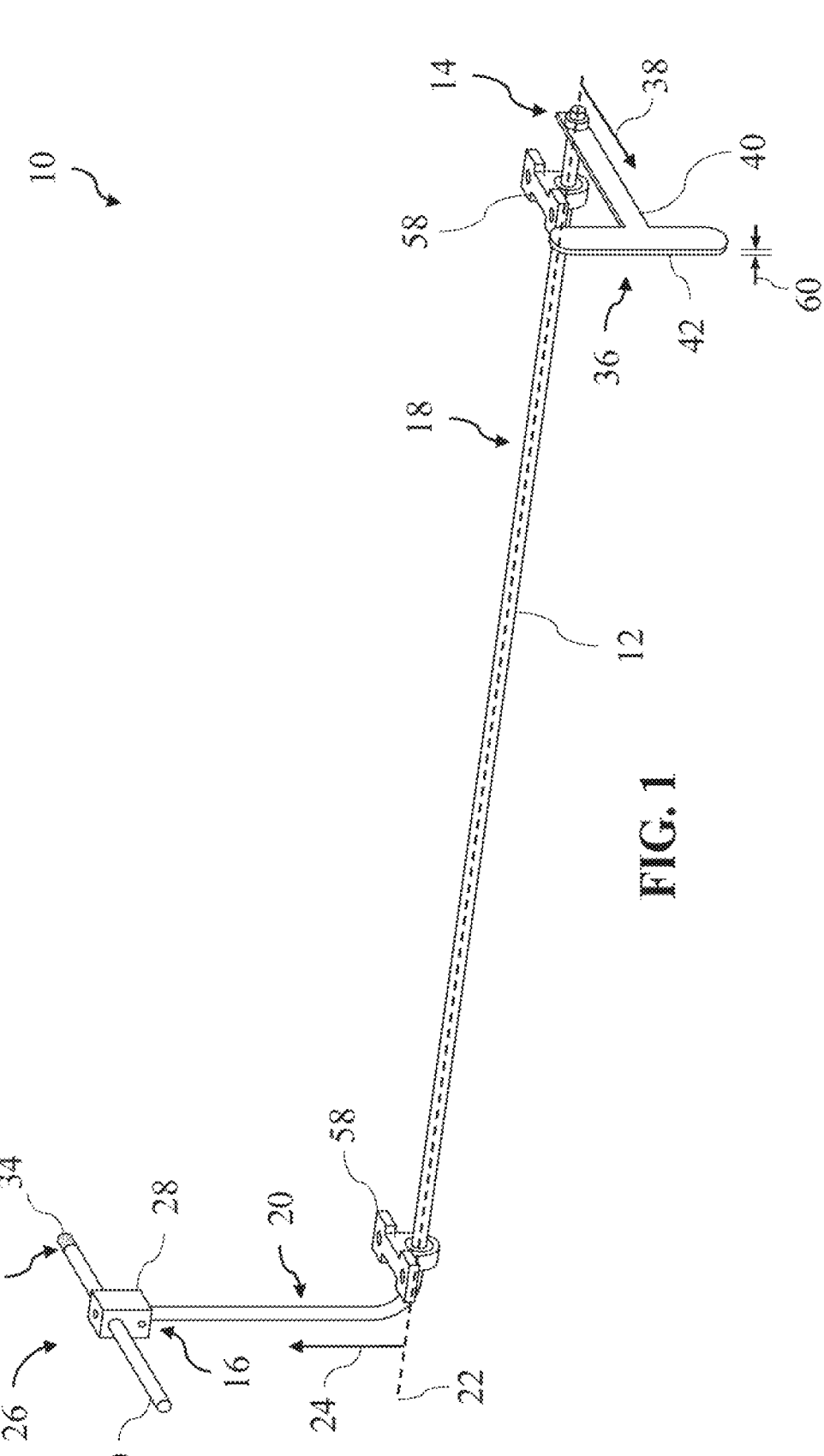
FIG. 1 is a perspective view of a pallet stop according to an embodiment of the present disclosure.
Figure 2:
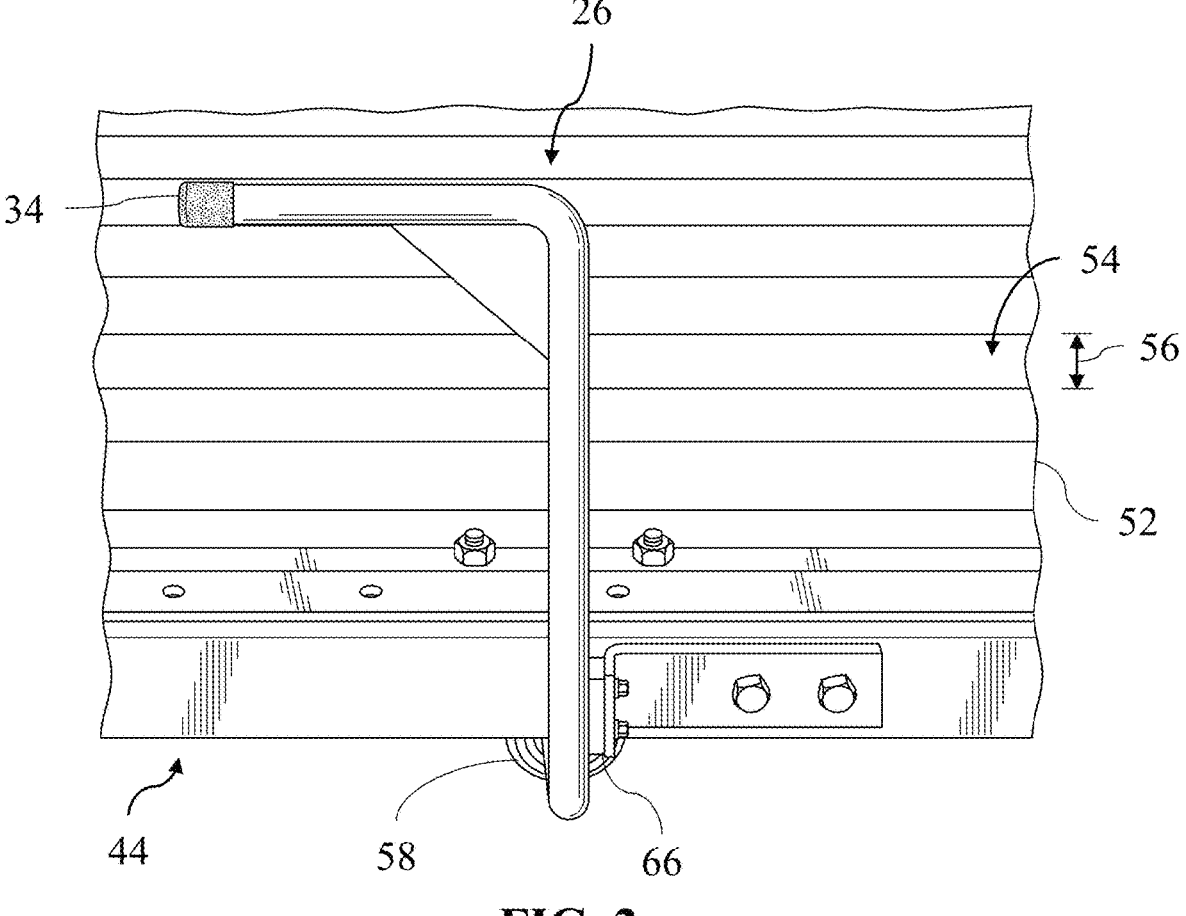
FIG. 2 is a perspective view of the pallet stop mounted to a conveyor, according to an embodiment of the present disclosure.

Referring to FIG. 1, a pallet stop 10 includes a main body 12 having a first end 14 and a second end 16. The main body 12 may include a first portion 18 and a second portion 20, wherein the first portion 18 includes the first end 14 and is aligned or centered upon a longitudinal axis 22 of the main body 12, and the second portion 20 includes the second end 16 and is angled to and/or extends radially away from the longitudinal axis 22 in a first direction 24. For example, the second portion 20 may be bent or angled at an angle within a range of 30-150 degrees, or the like, relative to the longitudinal axis 22. In some embodiments, the angle is 90 degrees or the first direction 24 is perpendicular to the longitudinal axis 22, or the like. In other words, the main body 12 may have an L-shape. The main body 12 may be composed of metal (e.g., steel), polymer, wood, ceramic, or the like. The main body 12 or at least the first portion 18 may include a cylindrical shape (e.g., the first portion 18 may be a rod of cold rolled steel).

A handle 26 is disposed at the second end 16 of the main body 12 and may be connected to or attached to the second end 16 by any suitable means to establish a secure connection between the handle 26 and the second end 16. For example, the handle 26 may be attached to the second end 16 by welding, adhesives, fasteners, or the like, or the handle 26 may be integrated with or formed as part of the main body 12. In some embodiments, handle 26 includes a pivot block 28 and a handle bar 30. The pivot block 28 may be secured to the second end 16 by fasteners (e.g., screws or bolts). For example, fasteners may secure the pivot block 28 to the second end 16 and/or second portion 20 from the sides and/or the pivot block 28 may include a female thread configured for a receiving a male thread of the second end 16, or vice versa. The handle bar 30 may be connected to the pivot block 28 or extend through or from the pivot block 28. The handle bar 30 may be secured to the pivot block 28 by any of the means discussed above. In some embodiments, a handle bar end 32 of the handle bar 30 includes a head 34 (i.e., a bumper) configured for absorbing or dampening an impact of the head 34 against a surface (e.g., a concrete floor). The head 34 may be composed of any suitable polymeric material, or the like, and may be attached to the handle bar end 32 by a fastener, adhesive, or the like. For example, the head 34 may include a threaded cylinder configured to be received by a threaded bore of the handle bar 30, or the head 34 may be slotted over the handle bar end 32 to cover the handle bar end 32, or the like. The handle bar 30 may be a cylindrical rod and/or may be shaped so as to promote ergonomic handling by a user's hand. The handle bar 30 may also include material for improving a user's handling or grip of the handle bar 30.

In some embodiments, the handle 26 includes the second portion 20 of the main body 12. In other words, the second end 16 may be aligned with the longitudinal axis 22 and the second portion 20 of the handle 26 is connected thereto such that the handle 26 extends radially away from the main body 12 and the longitudinal axis 22. In this way, one may easily adjust or interchangeably attach handles 26 at different angles or with varying lengths or shapes to the second end 16 without having to modify or replace the main body 12.

A stopper 36 is disposed at the first end 14 of the main body 12. The stopper 36 may be connected to or attached to the first end 14 by any suitable means to establish a secure connection between the stopper 36 and the first end 14. For example, the stopper 36 may be attached to the first end 14 by welding, adhesives, fasteners, or the like, the stopper 36 may be integrated with or formed as part of the main body 12. In some embodiments, the stopper 36 includes a shaft collar that is secured to the first end 14 by fasteners, or the like. The stopper 36 may extend outwardly or radially from the longitudinal axis 22 in a second direction 38 at an angle within a range of 30-150 degrees. For example, the stopper 36 may extend radially and perpendicularly from the first end 14 and the longitudinal axis 22, wherein the angle is 90 degrees. The stopper 36 may include a first segment 40 and a second segment 42, wherein the first segment 40 is connected to the first end 14 of the main body 12 and extends to the second segment 42. The second segment 42 may have a generally rectangular shape, diamond-like shape, circular shape, or the like. The stopper 36 may be composed of metal (e.g., steel), polymer, wood, ceramic, or the like, and may be formed by cutting (e.g., using a water jet, or the like), forging, molding, or the like.

The first direction 24 and the second direction 38 are offset relative to each other such that the handle 26 and the stopper 36 are orientated differently relative to the longitudinal axis 22. In other words, the handle 26 and the stopper 36 extend radially from the longitudinal axis 22 in different directions. In some embodiments, the first direction 24 may be perpendicular to or orientated 90 degrees to the second direction 38 such that the handle 26 and the stopper 36 may be orientated perpendicular to one another. In some embodiments, the first direction 24 may be orientated within a range of 30-150 degrees, or the like, relative to the second direction 38.

Referring to FIGS. 2 and 3A-C, the pallet stop 10 may be disposed underneath of a conveyor 44 configured for conveying a pallet 46 or a plurality of pallets 46 from a rear end 48 of the conveyor 44 to a front end 50 of the conveyor 44. The conveyor 44 may include a plurality of rollers 52 for conveying or moving the pallet 46 from the rear end 48 to the front end 50. For example, the pallet 46 may contain finished goods and may be loaded on to the conveyor 44 at the rear end 48, conveyed by the plurality of rollers 52 to the front end 50, and then removed from the conveyor 44 for future distribution, transportation, storage, or the like. The pallet 46 may be loaded on to or removed from the conveyor 44 by a truck, tugger, forklift, or the like. The terms rear end 48 and front end 50 are in relative reference to a worker unloading the pallet 46 from the front end 50 of the conveyor 44.

At least two of the plurality of rollers 52 are adjacent each other and are spaced apart and define a gap 54 therebetween having a gap width 60. In some embodiments, the plurality of rollers 52 are uniformly spaced apart from each other and form a plurality of gaps 54 having a common gap width 60. The plurality of rollers 52 may include wheels, balls, or the like.

The main body 12 may be partially or entirely disposed underneath the conveyor 44 such that the first end 14 is between the rear end 48 and the front end 50 of the conveyor 44 and the second end 16 is adjacent the front end 50 of the conveyor 44. The second end 16 may be disposed or extend past the front end 50 of the conveyor 44 (i.e., the second end 16 may be in front of the front end 50). In some embodiments, the main body 12 may be mounted or attached to an underside of the conveyor 44 (e.g., below or beneath the plurality of rollers 52) by a mounting member 58 or a plurality of mounting members 58 configured to allow the main body 12 to rotate, such as a pillow block bearing, or the like, while restraining the position of the main body 12 (e.g., preventing axial movement of the main body 12). In some embodiments, the main body 12 is connected to a floor and not attached to the conveyor 44.

Figure 4:
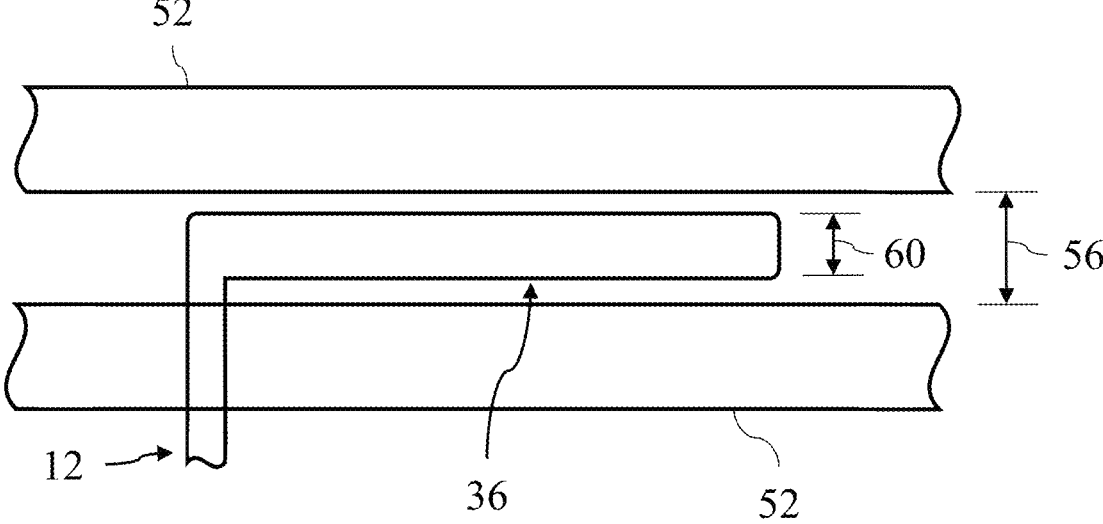
FIG. 4 is a top view of the pallet stop including a stopper having a width that is less than a width of a gap between at least two of a plurality of rollers of the conveyor, according to an embodiment of the present disclosure.

The handle 26 is positioned in front of the front end 50 of the conveyor 44. The stopper 36 is positioned between the rear end 48 and the front end 50 of the conveyor 44 and aligned with the gap 54 and/or between at least two of the plurality of rollers 52. For example, the stopper 36 may be parallel to the at least two of the plurality rollers 52 and centered upon the gap 54 such that the stopper 36 is coplanar with the gap 54. The stopper 36 includes a width or thickness 60 that is less than the gap width 60 (as shown in FIGS. 1 and 4). In this way, the stopper 36 can translate within or through the gap 54 between the at least two of the plurality rollers 52. In some embodiments, only the second segment 42 and/or partially the first segment 40 includes the width 60 so as to be able to move through the gap 54.

In an embodiment, the pallet stop 10 is configured to control the movement of the pallet 46 on the conveyor 44 so as to prevent the pallet 46 from falling off of the front end 50 of the conveyor 44. The pallet stop 10 is configured to rotate between a first position or orientation 62 and a second position or orientation 62 for controlling movement of the pallet 46 across the conveyor 44. A user may push or pull the handle 26 to move between the first position 62 and the second position 64 and rotate the handle 26 around the longitudinal axis 22.

Figures 3A, 3B, 3C:
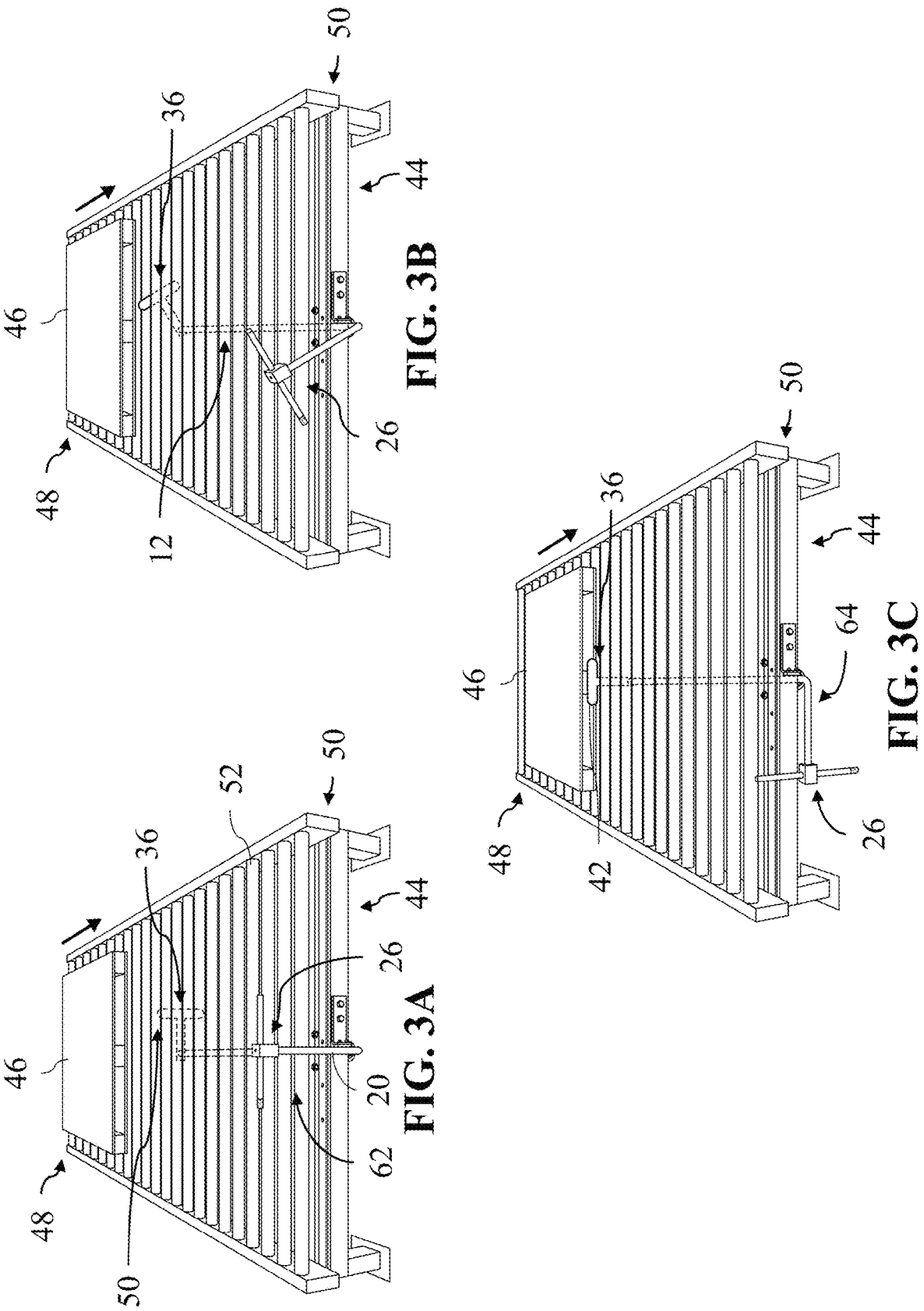
FIGS. 3A-C illustrate the pallet stop moving between a first position and a second position to control the movement of a pallet on the conveyor.

As shown in FIG. 3A, in the first position 62, the handle 26 is located higher than the conveyor 44 and/or the plurality of rollers 52 and the handle 26 and/or the second portion 20 prevents the pallet 46 from moving past the front end 50 of the conveyor 44. In other words, the handle 26 and/or the second portion 20 are vertically orientated higher than the conveyor 44 and prevent the pallet 46 from falling off of the conveyor 44 and from being unloaded by the truck, tugger, forklift, or the like. The stopper 36 is located lower than the conveyor 44 and/or the plurality of rollers 52 and does not interfere with the movement of the pallet 46 along the conveyor 44 (i.e., the stopper 36 is vertically orientated below or beneath relative to the conveyor 44 and/or the plurality of rollers 52). As shown in FIG. 3B, the handle 26 may be pushed to rotate the handle 26 and the stopper 36 around the longitudinal axis 22. Rotation of the handle 26 subsequently rotates the stopper 36, so as the handle 26 moves toward the floor the stopper 36 moves toward and through the gap 54. As shown in FIG. 3C, in the second position 64, the handle 26 is positioned lower than the plurality of rollers 52 (i.e., the handle 26 is relatively below a height of or a plane of the plurality of rollers 52) and does not block the movement of the pallet 46. The head 34 of the handle 26 may contact the floor. The stopper 36 and/or the second segment 42 are positioned higher than or protrude past the conveyor 44 and/or the plurality of rollers 52 and prevent the pallet 46 from moving toward the front end 50 of the conveyor 44.

The handle 26 and the stopper 36 prevent the pallet 46 from moving by physically contacting the pallet 46 (e.g., a bottom portion of the pallet 46) and resisting any forward force or movement from the pallet 46. The pallet stop 10 may prevent the pallet 46 from moving by a weight of the pallet stop 10, contact between the head 34 and/or the stopper 36 and the floor, the mounting members 58, or the like.

Accordingly, in the first position 62, a first pallet 46 may be loaded on to the rear end 48 and conveyed to the front end 50 of the conveyor 44. A user may then move the handle 26 to the second position 64 and unload the first pallet 46. During this time, a second pallet 46 may be loaded on to the rear end 48 of the conveyor 44. Until the pallet stop 10 is moved back to the first position 62, the second pallet 46 will be prevented from moving to the front end 50 of the conveyor 44 by the stopper 36. Therefore, the second pallet 46 cannot fall off of the front end 50 of the conveyor 44 and additional pallets 46 may not be loaded on to the rear end 48 of the conveyor 44. In this way, the pallet stop 10 acts as a failsafe in the event that the user does not move the pallet stop 10 back to the first position 62.

Referring to FIGS. 2 and 3A-C, in an embodiment, the pallet stop 10 includes a magnetic element 66 for magnetically securing the pallet stop 10 in the first position 62. The magnetic element 66 may be mounted to the conveyor 44 (e.g., by a bracket) adjacent the front end 50 of the conveyor 44 and proximal to the second portion 20 so that the second portion 20 is close to or in contact with the magnetic element 66 when the pallet stop 10 is in the first position 62. In this way, the magnetic element 66 is configured to prevent the pallet stop 10 from rotating from the first position 62 to the second position 64 without manipulation or force from the user.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An apparatus for controlling movement of a pallet on a conveyor having a plurality of rollers, the apparatus comprising:
   a main body configured to be mounted to the conveyor such that a first end of the main body is between a rear end and a front end of the conveyor, and a second end of the main body is adjacent the front end of the conveyor;
   a handle connected to the second end of the main body;
   a stopper connected to the first end of the main body;
   wherein the apparatus is configured to be rotated between a first position and a second position;
   wherein in the first position the handle is located higher than the plurality of rollers and prevents the pallet from moving past the front end of the conveyor, and the stopper is beneath the conveyor and aligned between at least two of the plurality of rollers; and
   wherein in the second position the stopper is located higher than the plurality of rollers and prevents the pallet from moving to the front end of the conveyor, and the handle is lower than when in the first position such that the handle does not block the pallet from moving past the front end of the conveyor.

2. The apparatus of claim 1 wherein the handle includes a head composed of a polymer, wherein the head contacts a floor when the apparatus is in the second position.

3. The apparatus of claim 1 wherein the stopper translates between the at least two of the plurality of rollers when the apparatus is rotated between the first position and the second position.

4. The apparatus of claim 1 further comprising a magnetic element configured to secure the apparatus in the first position by magnetically engaging a portion of the main body.

5. The apparatus of claim 4 wherein the magnetic element is mounted to conveyor adjacent the front end of the conveyor.

6. The apparatus of claim 1 wherein the apparatus is configured to be rotated around a longitudinal axis of the main body;

wherein the handle extends in a first direction from the longitudinal axis and the stopper extends in a second direction from the longitudinal axis.

7. An apparatus for controlling movement of an object on a conveyor, the apparatus comprising:

a main body located beneath the conveyor and having a first end and a second end;

a handle connected to the second end of the main body;

a stopper extending from the first end of the main body, wherein the stopper includes a thickness that is less than a width of a gap between two adjacent rollers of the conveyor;

wherein the apparatus is configured to be rotated around a longitudinal axis of the main body between a first position and a second position; and wherein in the first position the handle prevents the object from moving on the conveyor and in the second position the stopper prevents the object from moving on the conveyor.

8. The apparatus of claim 7 wherein the handle extends in a first direction from the longitudinal axis and the stopper extends in a second direction from the longitudinal axis; and wherein the first direction and the second direction are perpendicular to each other.

9. The apparatus of claim 7 wherein the stopper is positioned between a rear end and a front end of the conveyor and coplanar to the gap between the two adjacent rollers; and wherein the stopper translates through the gap when rotating between the first position and the second position.

10. The apparatus of claim 9 further comprising a magnetic element configured to secure the apparatus in the first position by magnetically engaging a portion of the main body; and wherein the handle and magnetic element are positioned adjacent the front end of the conveyor.

11. The apparatus of claim 7 wherein the main body is configured to be attached to the conveyor by a bearing.

12. The apparatus of claim 7 wherein in the first position the handle is above the conveyor and the stopper is beneath the conveyor; and wherein in the second position the handle is below the conveyor and the stopper is above the conveyor.

13. A method for controlling movement of an object on a conveyor, the method comprising:

rotating a handle around a longitudinal axis of a main body between a first position to a second position, wherein the handle is connected to a first end main body and the main body is underneath the conveyor;

wherein in the first position the handle is positioned higher than the conveyor and the object is prevented from moving past an end of the conveyor and a stopper connected to a second end of the main body is positioned lower than the conveyor;

wherein in the second position the stopper is positioned higher than the conveyor and prevents the object from moving to the end of the conveyor; and wherein the stopper translates through a gap between two adjacent rollers of the conveyor when moving between the first position and the second position.

14. The method of claim 13 wherein the object is a pallet.

15. The method of claim 13 wherein the stopper includes a thickness that is less than a width of the gap.

16. The method of claim 13 wherein a magnet magnetically secures the main body in the first position.

17. The method of claim 13 further comprising:

removing the object from the conveyor when the handle is in the second position.

18. The method of claim 13 wherein rotating the handle includes a worker physically and manually causing the handle to rotate.

19. The method of claim 13 wherein the object is prevented from moving by physically contacting the handle or main body in the first position and the stopper in the second position.

20. The method of claim 13 further comprising:

loading a first object on to the conveyor;

loading a second object on to the conveyor;

removing the first object from the end of the conveyor when the handle is in the second position; and moving the second object to the end of the conveyor after the first object has been removed and the handle is in the first position.

* * * * *